June 16, 1964  A. B. MENZER  3,137,601
PROCESS OF MAKING A GLASS FIBER REINFORCED PANEL
Filed Dec. 27, 1960  2 Sheets-Sheet 1
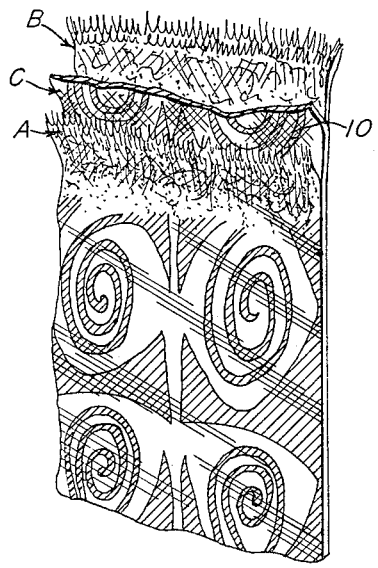
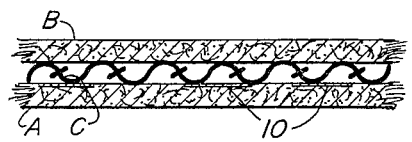
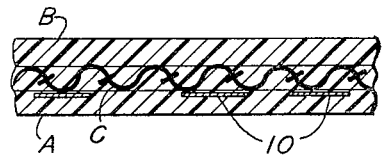
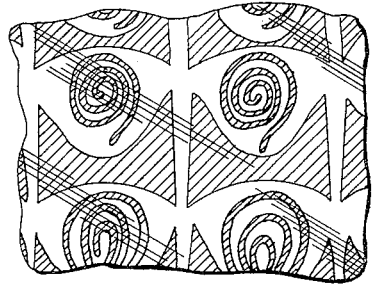
INVENTOR.
ALFRED B. MENZER
BY Carl C. Batz June 16, 1964     A. B. MENZER     3,137,601
PROCESS OF MAKING A GLASS FIBER REINFORCED PANEL
Filed Dec. 27, 1960     2 Sheets-Sheet 2
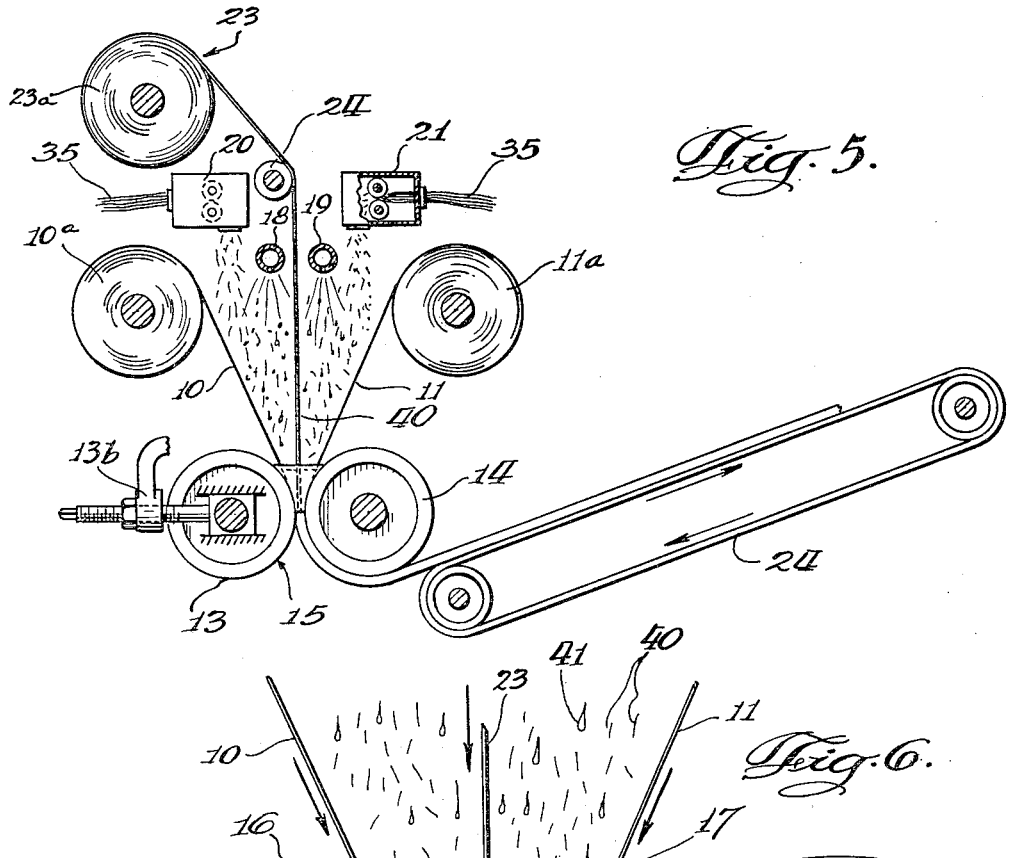
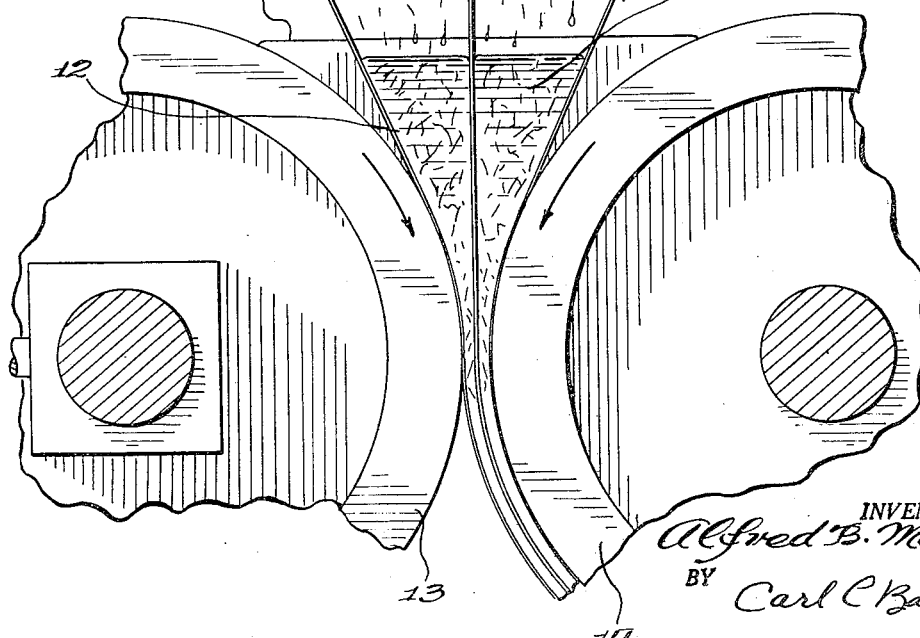
INVENTOR.
Alfred B. Menzer
BY Carl C. Batz
Attorney United States Patent Office 3,137,601
Patented June 16, 1964

3,137,601
PROCESS OF MAKING A GLASS FIBER
REINFORCED PANEL
Alfred B. Menzer, Joliet, Ill., assignor to Kemlite Corporation, Joliet, Ill., a corporation of Illinois
Filed Dec. 27, 1960, Ser. No. 78,771
5 Claims. (Cl. 156—62.2)

This invention relates to a plastic sheet material and more particularly to a laminated plastic sheet material bearing decorative matter such as printing or other treatment to provide a decorative design. The invention further relates to methods for producing such a sheet material when formed as an illuminated sign enclosing a light source.

Panels of resin impregnated glass fiber sheets are now in wide use in the building industry. In general, these sheets are made by dipping a sheet of fiberglass into a suitable resin such as a polyester resin so that the resin permeates the sheet; then the impregnated sheet is allowed to cure or set to form a firm strong sheet. The reinforced sheet or panel may be made in various colors by adding coloring material to the resin used in the process. The sheet may be made in varying thicknesses, and may be moulded in various forms priot to setting. The material is tough and strong, relatively light in weight, and can be easily cut or nailed. It is translucent and much of its value in the building field is due to its light transmitting characteristics.

It is a principal object of this invention to provide resin impregnated fiber sheets such as the type above described which carry on their interior an imprint or design of some kind, the imprint or design being protected in use while at the same time being visible from the side of the sheet. Another object is to provide a resin impregnated fiber sheet in laminated form and in which a decorative sheet is disposed between two reinforcing sheets. Another object is to provide a resin impregnated fiber sheet including outer reinforcing sheets and design forming material between these sheets, the sheets being bonded in a unitary structure, but arranged so as to protect the design. Another object of the invention is to form such a resin impregnated glass fiber sheet having decorative matter and reinforcing sheets, the sheets being translucent so as to display the decorative matter but without any distinctive display of the individual fibers which make up the sheets. Another object is to provide effective methods for making the fiber reinforced plastic sheets, and a further object is to provide structures in which the laminated fiber reinforced plastic sheets are arrnaged and formed about a light source to form unique displays.

The invention is illustrated in the accompanying drawings wherein: FIG. 1 is a perspective view of the sheet where the top edge has the various layers turned apart to show the different laminations; FIG. 2 is a fragmentary view in cross section of the sheet illustrated in FIG. 1, prior to impregnation; FIG. 3 is a view in cross section similar to FIG. 2, but after impregnation with resin; FIG. 4 is a fragmentary view in elevation of the sheet shown in FIG. 1; FIG. 5 is a schematic view in elevation of a machine for forming the glass fiber reinforced plastic sheets; and FIG. 6 is a broken enlarged view of the trough portion of the machine shown in FIG. 5.

As illustrated in FIGS. 1 to 4, the improved structure includes a pair of reinforcing sheets A and B, sheet A being the front sheet shown in FIG. 1, and B being the back sheet. Between sheets A and B is a center sheet C which is printed with a design on its front face.

Reinforcing sheets A and B are made of glass fibers arranged in crossed relation so as to form a matted structure. These sheets are flexible in the untreated form and may be purchased from glass manufacturers in the form of a large roll. Various thicknesses may be obtained depending on the desired thickness of the lamination of the finished product.

Instead of the fiberglass sheet above described, other fibrous sheets may be used; for example, sheets of polyester fiber such as Dacron (which is a filamentized polyester), in woven or unwoven form, or other synthetic fibers, such as acrylics, cellulose acetates, or nylon.

In the manufacture of my improved structure I may place a sheet A on a supporting surface, and on top of this I place the sheet C which bears the printed matter 10 which makes the design. Over sheet C I place the sheet B, which is similar to sheet A. Thus assembled, the three sheets may be dipped or otherwise passed through the resin liquid to impregnate the whole structure, after which the impregnated sheet is allowed to set or cure. Suitably the sheet is put in a heated chamber to accelerate the setting operation. The dipping step may be efficiently performed by passing the assembled layers together through a bath of the resin and then between a pair of squeeze rollers which serve to remove excess resin and to make the thickness of the sheet more uniform.

The resin which is employed in the impregnation of the fiber sheets may suitably be a polyester, epoxy, rigid vinyl, acrylic, or other thermosetting or thermoplastic resin. To give full effect to the invention the resin should be substantially transparent or at least translucent. A specific formulation which gives good results is given as follows:

| | Percent |
|---|---|
| Polyester (formed by reaction of propylene glycol, maleic anhydride and phthalic anhydride) | 50 |
| Styrene | 48 |
| Methyl methacrylate monomer | 2 |

Other specific formulations may be used in line with the information already known to the art dealing with resin impregnated materials.

It is a further feature of my invention, however, that the resin and the fiber sheets be selected so that the fiber sheets have substantially the same refractive index as the resin when set. I find that this condition is necessary to make the design clearly apparent and distinct and to avoid interference of visible fibers with the clear perception of the design. It will be recognized that in my improved structure the design is seen through the fiber structure and it is therefore important to facilitate undistorted light transmission through sheets A or B so as to properly reflect from the markings of the design, and also it is important that sheet C permit light transmission so as to pass light through the laminated structure at the unshaded or lightly shaded portions of the design. Accordingly, it is important that the fibrous structure making up each of sheets A, B, and C have a refractive index which is similar to that of the resin material in set condition. By having the fiber sheet C matched as to refractive index with the resin, I provide a finished laminated product of translucent character through which light may pass in varying manner while still presenting the design without any appearance of the center sheet on which the print is carried. The finished sheet, then, appears to be made of a unitary plastic sheet with the ink or other shading or coloring substance embedded in the center.

I prefer that the printing ink or other design forming material be graduated in its ability to transmit light rather than completely opaque, so that I may obtain the advantage of different tones as well as that of complete contrast between dark and light. In this way I am able to obtain particularly desirable effects in response to a light source from the back side of the panel.

I find it particularly advantageous to make the outer layers A and B, of a strong fibrous material such as fiberglass which with the polyester resin provides extra strong reinforcement and strength to the laminated sheet, while the center sheet C may be of a light fibrous material such as rayon (a filamentized acetate), or Dynel (a filamentized polymer of acrylonitrile and vinyl chloride), which is especially suited for carrying a decorative print. In this way I provide a panel which is very desirable both from the standpoint of decorative appearance and strength. I also provide translucence and effective light transmission without the tendency to break or shatter as would be the case with glass.

A specific embodiment of my invention having many advantages consists of a laminated sheet where the light fibrous sheet bearing the printed design, and disposed between the two glass fiber sheets, is of a cellulose material such as paper and where the resin which impregnates both the glass fiber sheets and the cellulose material has substantially the same light refractive properties as the resin and the glass fibers.

Also I find it particularly desirable to use a resin having a formulation of about 50% polyester (formed by reaction of propylene glycol, maleic anhydride and phthalic anhydride), about 20% acrylic resin, and about 30% styrene. Another preferred resin for use in my laminated structures is composed substantially completely of acrylic resin.

Instead of assembling the light weight design bearing sheet between the preformed glass fiber mats and then dipping the assembly into resin, I may use the improved method which is illustrated in FIG. 5. FIG. 5 shows schematically a device for incorporating the resin as the laminations are being made up. Still referring to FIG. 5, two rolls of film, such as cellophane, and designated 10a and 11a are mounted parallel and in spaced relationship, so that the films 10 and 11 issuing from these rolls proceeds downwardly to form a trough 12 in the form of a V, and pass through the small space between the spacing rolls 13 and 14. An adjusting device 13b is provided for altering the space between the rollers 13 and 14 to allow for making different thicknesses of the laminate. The end blocks 15 and 16 serve to keep the liquid resin 17 from escaping at the ends of the trough. Perforated pipes 18 and 19 are connected to a source of resin, and serve to deliver resin into the trough 12, so as to maintain a pool of resin within the trough. The roving cutters 20 and 21 which are above the trough 12 operate to cut the glass fiber yarn 35 into predetermined lengths such as about two inches, and distribute the same in random arrangement on the surface of the resin pool 17. The roving cutters 20 and 21 are of standard construction and are not shown in detail in the drawings. The cut glass fibers falling downwardly toward the pool 17 are designated by the character 40, and the resin droplets falling downwardly toward the pool 17 are designated by the character 41.

The turbulence of the resin in pool 17, upon operation of the machine, serves to pull the glass fibers under the surface, matting them as the material passes downwardly. The glass fibers and resin, enclosed on each side by the film material, passes between the rollers 13 and 14, and is carried away on the conveyor 24.

The roll 23a contains the printed paper sheet 23. The sheet 23, coming from the roll 23a, passes over the guide roll 24, and downwardly into the center of the trough 12, from which it passes in the center of the formed material, through the space between rolls 13 and 14, and away on the conveyor 24. This sheet 23 carries on one surface a design, such as a printed design. As in the previously described embodiment of the invention, the glass fibers which are distributed by the roving cutters into the resin, the paper sheet 23, and the resin 40 have light refractive properties which are substantially the same, with the result that the final laminate, consisting of resin impregnated printed paper layer between two layers of glass fibers with resin, is transparent or translucent, with the design being visible from both sides.

It will be understood that although only certain modifications of the invention have been described in detail herein, many changes and alterations may be made in line with the spirit of this disclosure and the skill of the art without departing from the invention.

This application is a continuation in part of my copending application Serial No. 587,520, filed May 28, 1956, now U.S. Patent No. 2,980,574.

I claim:

1. A process for preparing a plastic sheet comprising passing a pair of resin impermeable sheets downwardly and toward each other toward a pair of narrowly spaced rollers so as to form a trough in the general form of a V, introducing liquid resin into said trough to form a pool of resin, passing a printed sheet of light fibrous material downwardly between said resin impermeable sheets and through said pool of resin, introducing glass fibers into said pool of resin on each side of said printed sheet, passing said glass fibers, resin, and printed sheet while between said resin impermeable sheets through the space between said rollers, and subsequently curing the composite sheet so formed to set the resin.

2. A process for preparing a plastic sheet comprising passing a pair of resin impermeable sheets downwardly and toward each other toward a pair of spaced rollers so as to form a trough in the general form of a V, introducing liquid resin into said trough to form a pool of resin, cutting strands of glass fibers into fiber pieces free of attachment to each other, said cutting of strands being done at points above said pool so that said pieces fall freely downwardly into said pool of resin, introducing a sheet bearing a decorative design into said pool of resin and between said resin impermeable sheets, passing said fibers said resin and said design bearing sheet while between said resin impermeable sheets through the space between said rollers, and subsequently curing the composite sheet so formed to set the resin.

3. A process as set forth in claim 1 wherein said sheet of light fibrous material, said resin and said glass fibers are selected to have substantially the same light refractive properties, whereby said fibers come to be minimized in appearance.

4. A process as set forth in claim 1 wherein said resin impermeable sheets are cellophane sheets.

5. A process as set forth in claim 1 in which said resin is a polyester resin.

References Cited in the file of this patent

UNITED STATES PATENTS

| | | |
|---|---|---|
| 2,184,121 | Henriksen | Dec. 19, 1939 |
| 2,528,168 | Paulsen | Oct. 31, 1950 |
| 2,640,799 | Grargaard | June 2, 1953 |
| 2,662,044 | Morrison et al. | Dec. 8, 1953 |
| 2,754,865 | Moore | July 17, 1956 |
| 2,771,387 | Kleist et al. | Nov. 20, 1956 |
| 2,781,287 | Gustus et al. | Feb. 12, 1957 |
| 2,830,925 | Fennebresque et al. | Apr. 15, 1958 |
| 2,861,910 | Johnston et al. | Nov. 25, 1958 |
| 2,939,509 | Hoffman | June 7, 1960 |
| 2,944,994 | Singleton et al. | July 12, 1960 |
| 2,980,574 | Menzer | Apr. 18, 1961 |
| 3,056,222 | Boudouris | Oct. 2, 1962 |
| 3,075,429 | Deddo | Jan. 29, 1963 |

FOREIGN PATENTS

| | | |
|---|---|---|
| 1,195,048 | France | May 11, 1959 |
| 553,619 | Canada | Feb. 25, 1958 |